United States Patent [19]

Takeichi

[11] 4,414,578

[45] Nov. 8, 1983

[54] FLYBACK TRANSFORMER

[75] Inventor: Toshio Takeichi, Osaka, Japan

[73] Assignee: Sanyo Electric Co., Ltd., Osaka, Japan

[21] Appl. No.: 365,964

[22] Filed: Apr. 6, 1982

Related U.S. Application Data

[63] Continuation of Ser. No. 101,433, Dec. 10, 1979, abandoned.

[30] Foreign Application Priority Data

Dec. 15, 1978 [JP] Japan ............................... 53-158965

[51] Int. Cl.³ ............................................... H04N 5/68

[52] U.S. Cl. ..................................................... 358/243

[58] Field of Search .................. 358/243, 74; 336/185, 336/198, 208, 192, 96, 170, 171; 363/68; 315/383, 411

[56] References Cited

U.S. PATENT DOCUMENTS

| | | | |
|---|---|---|---|
| 3,213,397 | 10/1965 | Broverman | 336/198 X |
| 3,533,036 | 10/1970 | Wood | 336/208 |
| 3,904,928 | 9/1975 | Swada | 336/185 |
| 3,936,719 | 2/1976 | Miyoshi | 363/68 |
| 4,099,510 | 7/1978 | Perrier | 336/96 X |
| 4,126,816 | 11/1978 | Willis | 358/243 |
| 4,204,263 | 5/1980 | Onoue | 336/185 |
| 4,218,720 | 8/1980 | Kam | 358/243 |
| 4,343,028 | 8/1982 | Hicks | 358/243 |
| 4,345,275 | 8/1982 | Waybright | 358/243 |

*Primary Examiner*—Michael A. Masinick
*Attorney, Agent, or Firm*—Armstrong, Nikaido, Marmelstein & Kubovcik

[57] ABSTRACT

A flyback transformer comprising a low voltage coil wound on a first bobbin, a high voltage coil wound on a second bobbin, and a voltage detecting coil wound on a third bobbin. The first bobbin is formed of a hollow portion, in which a core is inserted. The second bobbin is formed of a hollow portion, in which the first bobbin is inserted. The third bobbin is formed of a hollow portion, in which the second bobbin is inserted. Accordingly, the voltage detecting coil is disposed outside the high voltage coil and is electromagnetically coupled to a portion of the high voltage coil.

13 Claims, 8 Drawing Figures

FLYBACK TRANSFORMER

This is a continuation, of application Ser. No. 101,433, filed Dec. 10, 1979 now abandoned.

BACKGROUND OF THE INVENTION

1. Field of the Invention

The present invention relates to a flyback transformer. More specifically, the present invention relates to a flyback transformer including a voltage detecting winding for detecting a voltage for the purpose of restricting an x-ray amount generated from a cathode ray tube in a television receiver.

2. Description of the Prior Art

FIG. 1 is a schematic diagram of one example of a circuit for restricting an x-ray amount generated from a cathode ray tube in a television receiver, in which the present invention can be advantageously employed. A flyback transformer 10 comprises a low voltage coil 11, a high voltage coil 12 and a voltage detecting coil 13. A resonance capacitor 111 is connected to the low voltage coil 11 for the purpose of harmonic tuning. The low voltage coil 11 is shunted with a damper diode 112 and is also shunted with a series connection of a horizontal deflection coil 113 and a capacitor 114. The high voltage coil 12 is divided into two, for example, the number of which may be increased as necessary, and a rectifying diode 123 is interposed in series between the divided high voltage windings 121 and 122, and a rectifying diode 124 is connected to the other divided high voltage coil 122. The output of the rectifying diode 124 is connected to a high voltage terminal 125. The high voltage coil 12(121) is connected to the base electrode of a transistor 21 constituting a protecting circuit 20. The output of the voltage detecting coil 13 is rectified by a rectifying diode 131 and is smoothed by a smoothing capacitor 132 and the output thus obtained is applied to one input of a bleeder resistor 23 constituting the protecting circuit 20. The voltage obtained from the bleeder resistor 23 is applied to the emitter electrode of the above described transistor 21 through a Zener diode 24. The base electrode of the transistor 21 is connected through a resistor 22 to a voltage supply +B and further through a resistor to a beam current limiting circuit 30. The beam current limiting circuit 30 is intended to limit the beam current not to exceed a predetermined value. The base electrode of the transistor 21 is further connected to another bias resistor. The output at the collector electrode of the transistor 21 is converted into a direct current voltage by means of an integration circuit 25 and is applied to a horizontal oscillation circuit 40. The horizontal oscillation circuit 40 is structured to be responsive to a predetermined value, say 0.5 V to 0.7 V, of the output voltage obtained from the circuit 25 to stop an oscillating operation. Such a protecting circuit for restricting an x-ray amount generated by a cathode ray tube is well known to those skilled in the art.

In such a conventional television receiver, it is necessary to obtain a voltage or a current associated with the flyback pulse in some form from the flyback transformer 10. Although it is possible to obtain such a current with ease from the high voltage coil 12 of the flyback transformer 10, it is necessary to provide a voltage detecting coil as shown in FIG. 1 in order to obtain such a voltage. As an alternative approach to obtain such a voltage from the flyback transformer 10, an approach may be considered to divide the high voltage developed at the high voltage terminal 125 of the flyback transformer 10 directly by means of a voltage dividing resistor. However, in such a case a resistor of high resistance for voltage dividing a high voltage is required, which not only makes a cost expensive but also causes diversified resistance characteristics, uncertainty by virtue of environmental influences and the like. Therefore, it has been a conventional practice to provide a voltage detecting coil 13 as an expedient for voltage detection, which is most typically coupled to the low voltage coil 13 as a third coil.

The following disadvantages are encountered by such a conventional flyback transformer wherein a voltage detecting coil is electromagnetically coupled to a low voltage coil. More specifically, in general a high voltage output (HV) generated by the high voltage coil 12 is liable to fluctuate in association with the beam current (I), but the conventional flyback transformer involves a problem that the detected output (DV) cannot sufficiently follow a fluctuation of the high voltage output (HV). More specifically, as shown by the curve A in FIG. 2, the conventional flyback transformer involved a problem that a variation of the ratio DV/HV of the detected output (DV) to the high voltage output (HV) with respect to the beam current (I) was conspicuously large. Thus, large fluctuation of the voltage ratio (DV/HV) with respect to a variation of the beam current (I) means that a fluctuation of the high voltage output (HV) and a fluctuation of the detected output (DV) do not occur at the same rate. In such a case, by way of an extreme situation, the protecting circuit 20 is not operable in spite of the fact that the high voltage output (HV) has reached a value in which an x-ray amount is to be restricted, with the result that an x-ray exceeding a predetermined value is generated from the cathode ray tube, not shown. Another problem is that although conventionally a resonance capacitor 111 has been connected to the low voltage coil 11 for the purpose of stabilization of the high voltage output the resonance capacitor is susceptible to a decreasing change of a capacitance value as a function of the lapse of time. In such a situation, assuming that the capacitance of the resonance capacitor 111 has decreased to a half of the original value, the characteristic of the voltage ratio (DV/HV) with respect to the beam current (I) becomes as shown by the curve A' in FIG. 2. Accordingly, in case of a flyback transformer wherein a harmonic tuning has been achieved by means of the low voltage coil 11 and the capacitor 111, the above described disadvantage is more aggravated.

SUMMARY OF THE INVENTION

According to the present invention, a voltage detecting coil is electromagnetically coupled dominantly to a high voltage coil in a flyback transformer. More specifically, a flyback transformer is provided wherein a low voltage coil is wound inside a high voltage coil whereas a voltage detecting coil is wound outside the high voltage coil.

According to the present invention, even in case where there occur a variation of a beam current of a cathode ray tube and a (decreasing) change of the capacitance value of a resonance capacitor coupled to a low voltage coil of a flyback transformer, the variation of the output of a voltage detecting coil sufficiently follows a change of the output of a high voltage coil of the flyback transformer, so that any substantial malfunction does not occur in a circuit using such a voltage detected output.

According to the present invention, another unique advantage is brought about that a voltage ratio of the detected voltage output to the high voltage output with respect to a change of the beam current does not fluctuate so much, with the result that an advantageous flyback transformer is provided.

In a preferred embodiment of the present invention, a low voltage coil is wound on a first bobbin and a core is inserted into a hollow portion of the first bobbin. A high voltage coil is wound on a second bobbin which is provided outside the first bobbin. A voltage detecting coil is wound on a third bobbin which is further provided outside the second bobbin. Thus, the voltage detecting coil is electro-magnetically coupled to the high voltage coil. At that time, a sufficient spatial distance or surfacial distance is attained between the third bobbin and the high voltage coil, so that any damage due to a discharge by the high voltage may be avoided.

Accordingly, a principal object of the present invention is to provide an improved flyback transformer including a voltage detecting coil.

Another object of the present invention is to provide a flyback transformer, wherein the output voltage of the voltage detecting coil sufficiently follows the output voltage of the high voltage coil.

A further object of the present invention is to provide a flyback transformer, wherein a detected voltage is obtained with little fluctuation by virtue of the beam current.

Still a further object of the present invention is to provide a flyback transformer, wherein the detected output of little fluctuation is provided in spite of a decrease of the resonance capacitance.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
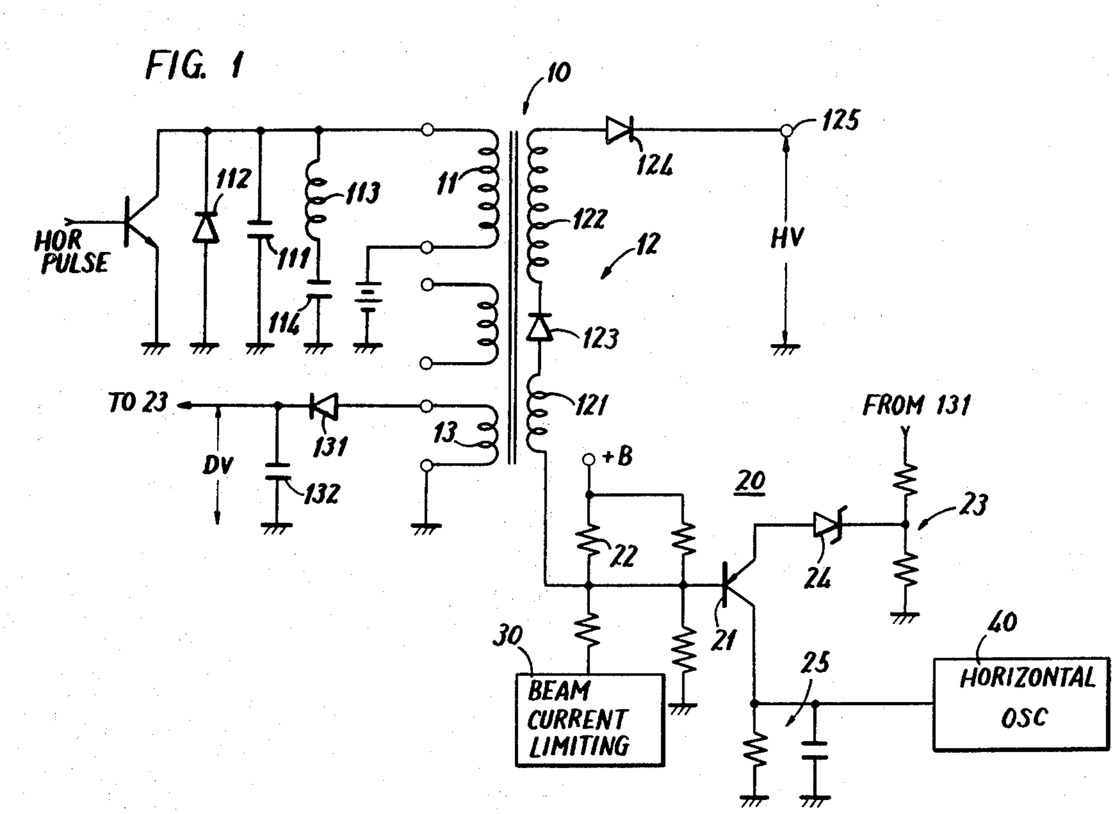
FIG. 1 is a schematic diagram showing a conventional flyback transformer and a circuit associated therewith, in which the present invention can be advantageously employed.
Figure 2:
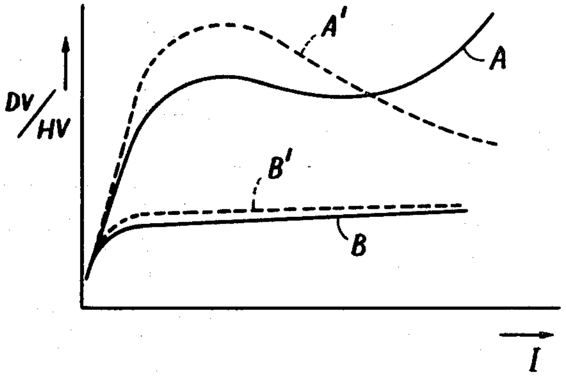
FIG. 2 is a graph showing a variation of the voltage ratio (DV/HV) with respect to a beam current (I)
Figure 3:
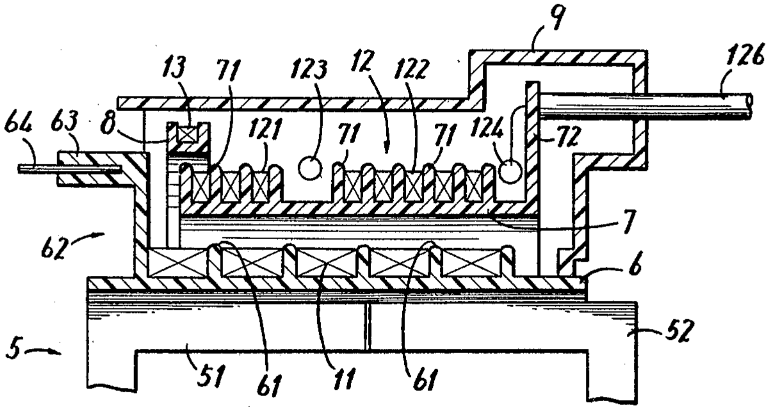
FIG. 3 is a sectional view showing one embodiment of the present invention.

FIG. 3 is a sectional view showing one embodiment of the present invention. A flyback transformer 10 comprises a low voltage coil 11, a high voltage coil 12 and a voltage detecting coil 13. The low voltage coil 11 is wound on a first bobbin 6. A leg portion of a core 5 comprising two halved cores 51 and 52 is inserted into the hollow portion of the bobbin 6. A second bobbin 7 on which the high voltage coil 12(121 and 122) is wound is provided outside the first bobbin 6. More specifically, the high voltage coil 12 is wound outside the low voltage coil 11. By way of a characteristic feature of the present invention, a third bobbin 8 on which the voltage detecting coil 13 is wound is provided further outside the second bobbin. More specifically, the voltage detecting coil 13 is disposed outside the high voltage coil 12(121 and 122). Accordingly, the voltage detecting coil 13 is much less electromagnetically coupled to the low voltage coil 11 disposed inside the high voltage coil 12 and is much more influenced by the high voltage coil 12. Accordingly, the output of the voltage detecting coil 13 has a voltage waveform very analogous to the output waveform of the high voltage coil 12. Therefore, when the voltage induced at the high voltage coil 12 changes as the beam current and the resonance capacitance change, for example, the output of the voltage detecting coil 13 accordingly changes following the change of the beam current and the resonance capacitance. More specifically, the voltage ratio (DV/HV) of the detected voltage output (DV) to the high voltage output (HV) by means of the FIG. 3 embodiment does little fluctuate with respect to a change of the beam current (I), as shown by the curve B in FIG. 2. Accordingly, when the high voltage output (HV) fluctuates as the beam current (I) fluctuates, it follows that the detected voltage output (DV) accordingly changes at substantially the same rate. On the other hand, even in case where the capacitance of the resonance capacitor 111 shown in FIG. 1 becomes a half of the original value, for example, by way of a time dependent change, the voltage ratio (DV/HV) remains approximately constant, as shown by the curve B' in FIG. 2, which substantiates an excellent characteristic of the present invention. Meanwhile, it is pointed out that in the FIG. 3 embodiment the bobbins 6 and 7 have been made as a split type, so that the plurality of partitions 61 have been formed. Similarly, the second bobbin 7 has been formed of a plurality of partitions 71. Rectifying diodes 123 and 124 are disposed between the partitions where no coil is wound. The output of the rectifying diode 124 is connected to a high voltage output lead wire 126. A terminal plate portion 62 is formed at one end in the length direction of the first bobbin, i.e. the low voltage bobbin and a terminal supporting portion 63 is formed in the terminal plate portion. A pin or terminal 64 is embedded in each of the terminal supporting portions 63.

Figure 4:
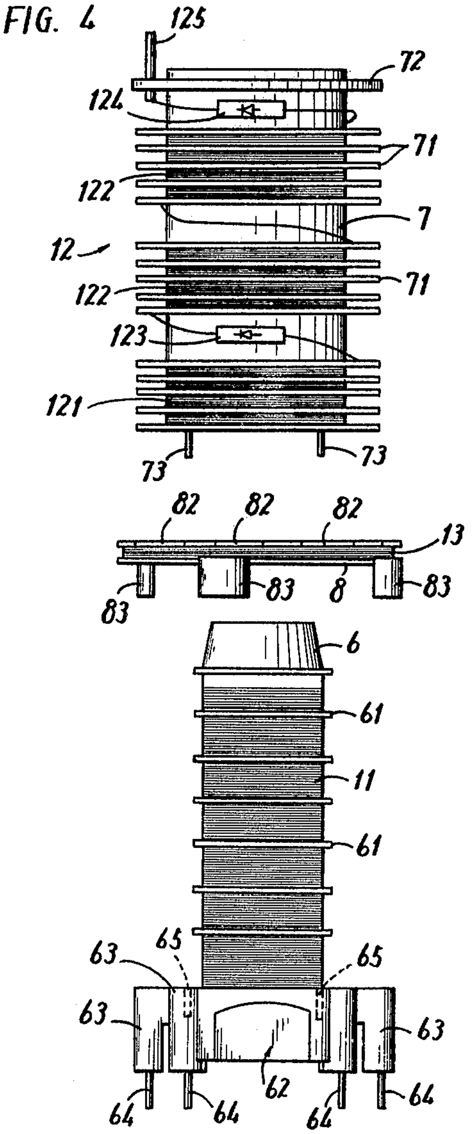
FIG. 4 is an exploded view showing a preferred embodiment of the present invention.
Figure 5:
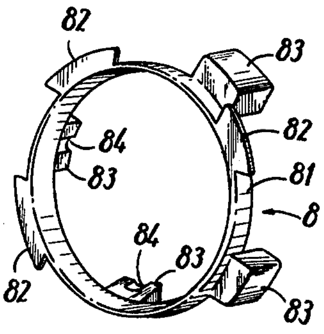
FIG. 5 is a perspective view showing a third bobbin for a voltage detecting coil.
Figure 6:
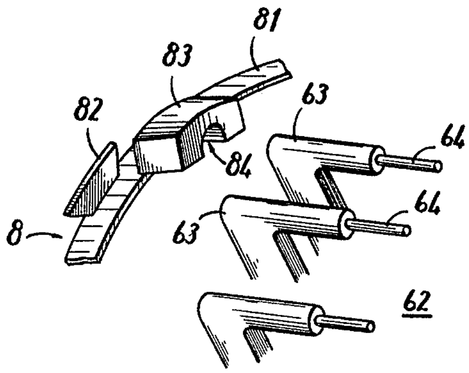
FIG. 6 is a fragmentary view showing a manner of fixing the FIG. 5 bobbin to a terminal supporting portion.

FIG. 4 is a view showing a preferred embodiment of the present invention. The low voltage bobbin or the first bobbin 6 is formed of a plurality of partitions 61 as distributed in the length direction for the purpose of split winding, as previously described. The low voltage coil 11 is wound as divided between the partitions 61. The bobbin 6 is formed at one end thereof of a terminal plate portion 62, which is formed of a plurality of terminal supporting portions 63 for supporting the terminals 64. As better seen from FIG. 6, the terminal supporting portions 63 are formed as the convex portions. The first bobbin 6 is formed as hollow, so that the leg portion of the core 5 (FIG. 3) may be inserted therethrough. The high voltage coil bobbin or the second bobbin 7 is also formed of a plurality of partitions 71 for the purpose of the split winding and a high voltage coil 12(121 and 122) are wound as divided between the partitions 71. The bobbin 7 is provided at one end thereof with a flange 72, which is further provided with a high voltage output terminal 125. The rectifying diode 123 is mounted between the partitions 71 having a relatively wide spacing therebetween and the rectifying diode 124 is mounted between the partition 71 and the flange 72. The bobbin 7 is further provided at the other end thereof with protrusions 73, which are used to support the bobbin 7 by means of the terminal plate portion 62. More specifically, the terminal plate portion 62 is formed of apertures 65 as shown by the dotted line in FIG. 4, so that insertion of the protrusions 73 to the apertures 65 can achieve fixing of the bobbin 7 by the terminal plate portion 62. The bobbin 7 with the high voltage coil 12 as split wound is hollow, so that the first bobbin 6 may be inserted into the hollow portion of the bobbin 7.

The third bobbin 8 for winding of the voltage detecting coil 13 is a very short cylinder as compared with the other bobbins 6 and 7. The voltage detecting coil 13 is wound on the short cylinder portion 81 of the bobbin 8. The bobbin 8 is formed, at one end of the cylinder portion 81, of a plurality of protrusions 82. The bobbin 8 is also formed, at the other end of the cylinder portion 81, of a plurality of fixing protusions 83. The fixing protrusions 83 are formed as distributed along the periphery of the cylinder portion 81. These protrusions 82 and the fixing protrusions 83 are cooperative to define the width or the end portion of the voltage detecting coil 13 wound on the cylinder portion 81. Accordingly, the protrusions 82 may be of a partition shape, although in the embodiment a protrusion form was employed in consideration of facility and cost of fabrication. The recesses 84 are formed at the inner side of the fixing protrusions 83. The recesses formed on the fixing protrusions 83 are adapted to fit to the terminal supporting portions 63 described previously. As a result, the third bobbin 8 is fixedly supported by the terminal plate portion 62. Meanwhile, the hollow portion of the bobbin 8 is selected to be larger than the outer diameter of the partitions 71 and 72 of the second bobbin 7. Accordingly, the bobbin 8, i.e. the voltage detecting coil 13 can be disposed outside the bobbin 7, i.e. the high voltage coil 12.

In assemblage, first of all the coils 11, 12 and 13 are wound on the bobbins 6, 7 and 8, respectively. Then the bobbin 6 is inserted through the hollow portion of the bobbin 8 and the bobbin 8 is fixedly supported by the terminal plate portion 62. At the same time the bobbin 7 is inserted so that the bobbin 7 comes outside the bobbin 6 and inside the bobbin 8, whereby similarly the bobbin 7 is fixedly supported by the terminal plate portion 62. Thereafter the ends of the low voltage coil 11, the high voltage coil 12 and the voltage detecting coil 13 are electrically connected to the corresponding ones of the plurality of pins 64.

Figure 7:
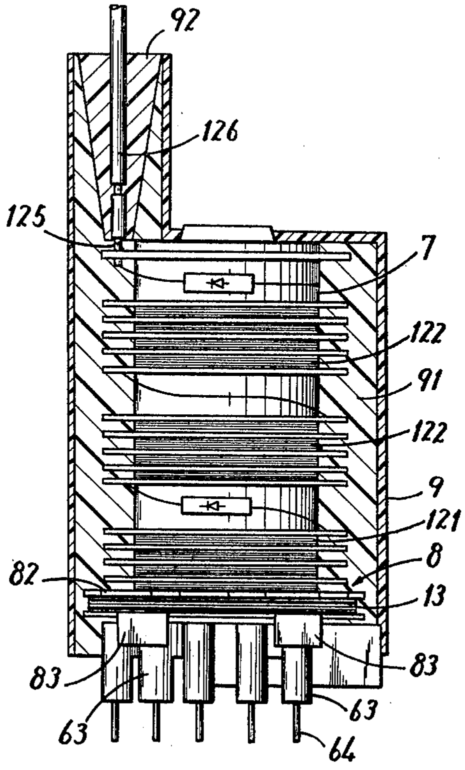
FIG. 7 is a diagrammatic view showing one embodiment of the present invention, in which resin is poured.
Figure 8:
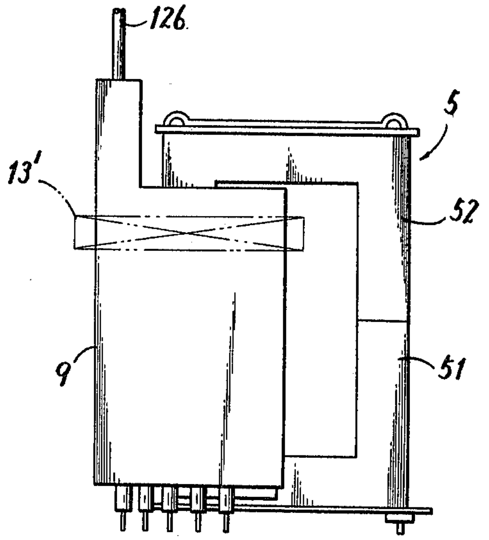
FIG. 8 is a view for showing an appearance of a flyback transformer completed in accordance with the present invention.

Thus the bobbins 6, 7 and 8 with the respecive coils wound are made unitary and thereafter the assembly is housed within an insulation casing 9 as shown in FIG. 7. The insulation casing 9 is made of synthetic resin, for example. Insulating resin such as epoxy resin is poured into the insulation casing 9, so that the respective bobbins 6, 7 and 8 and thus the coils 11, 12 and 13 are made unitary with the resin. More specifically, the resin layer 91 is formed such that the resin as molten is poured into the insulation casing 9 while the insulation casing 9 is turned upside down as compared with the FIG. 7 illustration and a heat resistive rubber bushing, not shown, of the same shape as a resin layer 92 is fixed to a portion where the resin layer 92 is to be formed subsequently, whereupon the resin is heat set. After the resin layer 91 is heat set, the rubber bushing, not shown, is removed and, with a high voltage lead wire 126 connected to the high voltage output terminal 125, resin of a normal temperature setting characteristic is poured, so that for a little while the resin is set to form the resin layer 92. After the respective coils 11, 12 and 13 are made integral with the resin, the core 5 is inserted into the hollow portion of the bobbin 6. The core 5 has been divided into two portions 51 and 52 and the leg portions of the divided cores are inserted into the hollow portion of the bobbin 6 and then these two portions 51 and 52 are fixed to be unitary by means of screws or the like. Thus, the flyback transformer 10 as shown in FIG. 8 is completed. The detected voltage as induced in the voltage detecting coil is applied to the protecting circuit as in case of the FIG. 1 example.

It would be appreciated that in practicing the present invention various modifications and changes may be made by those skilled in the art besides the preferred embodiments of the present invention described in the foregoing. For example, in order to electromagnetically couple the voltage detecting coil dominantly to the high voltage coil, the following modification may be considered. For example, in such a state wherein the low voltage coil 11, i.e. the bobbin 6 and the high voltage coil 12, i.e. the bobbin 7 are made unitary, the same is put in the insulation casing 9 as shown in FIG. 7 and the resin is poured therein. In such a situation, the voltage detecting coil is missing in the insulation casing 9, as different from the above described embodiment. Thereafter the voltage detecting coil 13' is disposed outside the insulation casing 9 as shown by a phantom line in FIG. 8 and is fixed using an adhesive agent or the like. Then it follows that as in case of the previously described embodiment the voltage detecting coil 13' is electromagnetically coupled dominantly to the high voltage coil.

Even in the case where the voltage detecting coil 13 is housed in the insulation casing 9, it is not necessary to dispose the voltage detecting coil 13 at the lower voltage portion of the high voltage coil 12 as shown in FIG. 7 (FIG. 4) and alternatively the voltage detecting coil 13 may be disposed at the higher voltage portion of the high voltage coil 12, i.e. in the vicinity of the partition 72, provided that sufficient withstand voltage characteristic is achieved.

Alternatively the voltage detecting coil may be made of a heat fusion wire, in which case the bobbin 8 may be dispensed with. Such a heat fusion wire may be a wire including a conductor covered with a thermal setting resin material layer. Such a wire is wound in a coil and then heated until the coils become unitary through adhesion and setting of the resin layer.

Alternatively, the voltage detecting coil may be wound on the bobbin for the high voltage coil by providing a sufficient spacing for insulation.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An apparatus for use in a television receiver having a cathode ray tube for restricting the amount of X-ray radiation from said cathode ray tube comprising:

a core;

a low voltage coil wound outside said core, said low voltage coil for receiving an input voltage;

a high voltage coil wound on a second bobbin outside of said low voltage coil in a coaxial relation with said low voltage coil for providing a high voltage which is induced therein;

a voltage detecting coil means of a relatively small number of turns with respect to the number of turns of said high voltage coil, wound outside of said high voltage coil in a coaxial relation with said low voltage coil and said high voltage coil for having induced therein a relatively small voltage representing the magnitude of the output voltage of said high voltage coil, and for providing an output indicative of the output of said high voltage and wherein said voltage detecting coil means is electrically isolated from said high voltage coil and said low voltage coil and is electromagnetically coupled to said high voltage coil, and a third bobbin having a length substantially less than the length of said second bobbin, said voltage detecting coil means being wound on said third bobbin wherein said third bobbin has a hollow portion, and said second bobbin, on which said high voltage coil is wound, is inserted into said hollow portion of said third bobbin; and means responsive to the output of said voltage detecting coil means exceeding a predetermined value for restricting the amount of X-ray radiation being radiated from said cathode ray tube.

2. An apparatus in accordance with claim 1, wherein said high voltage coil comprises a plurality of divided coil portions, and a rectifying diode connected in series between said divided high voltage coil portions.

3. An apparatus in accordance with claim 1, which further comprises a first bobbin on which said low voltage coil is wound, said first bobbin having a hollow portion, said core being inserted into said hollow portion of said first bobbin.

4. An apparatus in accordance with claim 3, wherein said second bobbin has a hollow portion, said first bobbin on which said low voltage coil is wound is inserted into said hollow portion of said second bobbin.

5. An apparatus in accordance with claim 3, wherein said voltage detecting coil means is electromagnetically coupled to a portion of said high voltage coil.

6. An apparatus in accordance with claim 4, which further comprises a terminal plate portion formed integrally with said first bobbin at one end in terms of the length direction thereof, said second bobbin being fixedly mounted to said terminal plate portion.

7. An apparatus in accordance with claim 1, which further comprises a terminal plate portion formed integrally with said first bobbin at one end in terms of the length direction thereof, said third bobbin being fixedly mounted to said terminal plate portion.

8. An apparatus in accordance with claim 1, which further comprises a resin layer for integrally molding said low voltage coil, high voltage coil and voltage detecting coil means.

9. An apparatus in accordance with claim 1, which further comprises a resin layer for integrally molding said low voltage coil and said high voltage coil, said voltage detecting coil means being provided outside said molding resin layer so as to be electromagnetically coupled to said high voltage coil.

10. An X-ray radiation restricting apparatus according to claim 11, wherein:

said television receiver comprises:

horizontal oscillation circuit means for providing a horizontal oscillation signal; and means responsive to said horizontal oscillation signal for providing said input voltage to said low voltage coil;

said X-ray radiation restricting means comprises means responsive to the output of said voltage detecting coil means exceeding a predetermined value for disabling said horizontal oscillation circuit means.

11. An apparatus in accordance with claim 1, wherein:

said high voltage coil is spaced apart from said low voltage coil, whereby said voltage detecting coil means is more closely coupled to said high voltage coil than to said low voltage coil.

12. An apparatus in accordance with claim 1, wherein said terminal plate portion includes terminal supporting portions and said third bobbin includes fixing protrusions having recesses therein, said terminal supporting portions fitting into said recesses.

13. An apparatus in accordance with claim 1, wherein said third bobbin includes a voltage detecting coil means being wound on said third bobbin between said protruding portion and said fixing portions.

* * * * *